(12) United States Patent
Aoyagi

(10) Patent No.: US 8,620,313 B2
(45) Date of Patent: Dec. 31, 2013

(54) MOBILE COMMUNICATION METHOD AND NETWORK DEVICE

(75) Inventor: Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 71 days.

(21) Appl. No.: 12/934,409

(22) PCT Filed: Mar. 24, 2009

(86) PCT No.: PCT/JP2009/055855
§ 371 (c)(1),
(2), (4) Date: Dec. 6, 2010

(87) PCT Pub. No.: WO2009/119606
PCT Pub. Date: Oct. 1, 2009

(65) Prior Publication Data
US 2011/0077004 A1 Mar. 31, 2011

(30) Foreign Application Priority Data
Mar. 24, 2008 (JP) ................. 2008-076678

(51) Int. Cl.
*H04W 4/00* (2009.01)
*H04W 40/00* (2009.01)

(52) U.S. Cl.
USPC ........ 455/434; 455/424; 455/422.1; 455/449; 455/446; 455/411; 455/435

(58) Field of Classification Search
None
See application file for complete search history.

(56) References Cited

U.S. PATENT DOCUMENTS

| | | | |
|---|---|---|---|
| 6,178,327 B1 * | 1/2001 | Gomez | 455/445 |
| 2003/0040313 A1 * | 2/2003 | Hogan et al. | 455/435 |
| 2003/0119501 A1 * | 6/2003 | Kim | 455/433 |
| 2004/0157600 A1 * | 8/2004 | Stumpert et al. | 455/432.1 |
| 2006/0084443 A1 * | 4/2006 | Yeo et al. | 455/449 |
| 2007/0097938 A1 | 5/2007 | Nylander et al. | |
| 2007/0105527 A1 | 5/2007 | Nylander et al. | |
| 2007/0105568 A1 | 5/2007 | Nylander et al. | |
| 2007/0183427 A1 | 8/2007 | Nylander et al. | |
| 2007/0202877 A1 * | 8/2007 | Hogan | 455/436 |
| 2008/0188215 A1 * | 8/2008 | Bergstrom et al. | 455/424 |

(Continued)

FOREIGN PATENT DOCUMENTS

CN   1705401 A   12/2005
WO   2007 040454   4/2007

OTHER PUBLICATIONS

Official Action dated Jan. 25, 2013, in counterpart Chinese Patent Application 200980110148.8, with English translation.

(Continued)

*Primary Examiner* — Kent Chang
*Assistant Examiner* — Benjamin Morales Fernandez
(74) *Attorney, Agent, or Firm* — Oblon, Spivak, McClelland, Maier & Neustadt, L.L.P.

(57) ABSTRACT

To improve continuity in a communication service while preventing wasteful power consumption in the mobile station, in the mobile communication method of the present invention comprises a step A of the mobile station communicating with a macro cell measuring and reporting reception quality in a neighboring cell of the macro cell, the neighboring cell being notified by a network device, and the network device detecting a home cell that does not allow access from the mobile station, and step B of the network device notifying the mobile station of the neighboring cell of the macro cell excluding the detected cell that does not allow access from the mobile station.

4 Claims, 5 Drawing Sheets

(56) References Cited

U.S. PATENT DOCUMENTS

| | | | |
|---|---|---|---|
| 2008/0194235 A1* | 8/2008 | Dalsgaard et al. | 455/411 |
| 2008/0207170 A1* | 8/2008 | Khetawat et al. | 455/411 |
| 2008/0207209 A1* | 8/2008 | Katori et al. | 455/447 |
| 2008/0227447 A1* | 9/2008 | Jeong et al. | 455/434 |
| 2008/0280604 A1* | 11/2008 | Ore et al. | 455/424 |
| 2009/0047968 A1* | 2/2009 | Gunnarsson et al. | 455/446 |
| 2009/0082020 A1* | 3/2009 | Ch'ng et al. | 455/435.3 |
| 2009/0215452 A1* | 8/2009 | Balasubramanian et al. | 455/434 |

OTHER PUBLICATIONS

Office Action issued Dec. 4, 2012, in Japanese Application No. 2008-076678 with English Translation.

NTT DOCOMO, Institute for Infocomm Research, "Cell ID Assignment for Home Node B [online]," 3GPP TSG-RAN WG1#50 R1-073684, Aug. 20, 2007, pp. 1-4. (In English Language).

* cited by examiner

FIG. 3

MACRO CELL #A

| NEIGHBORING CELL | FREQUENCY |
|---|---|
| MACRO CELL #B | SAME FREQUENCY |
| MACRO CELL #C | DIFFERENT FREQUENCY |
| ⋮ | ⋮ |
| HOME CELL #a | SAME FREQUENCY |
| HOME CELL #b | SAME FREQUENCY |
| HOME CELL #c | SAME FREQUENCY |
| ⋮ | ⋮ |

FIG. 4

| CELL | MOBILE STATION ALLOWED TO ACCESS |
|---|---|
| HOME CELL #a | #1 |
| HOME CELL #b | #100~#200 |
| HOME CELL #c | #10, #20 |
| ⋮ | ⋮ |

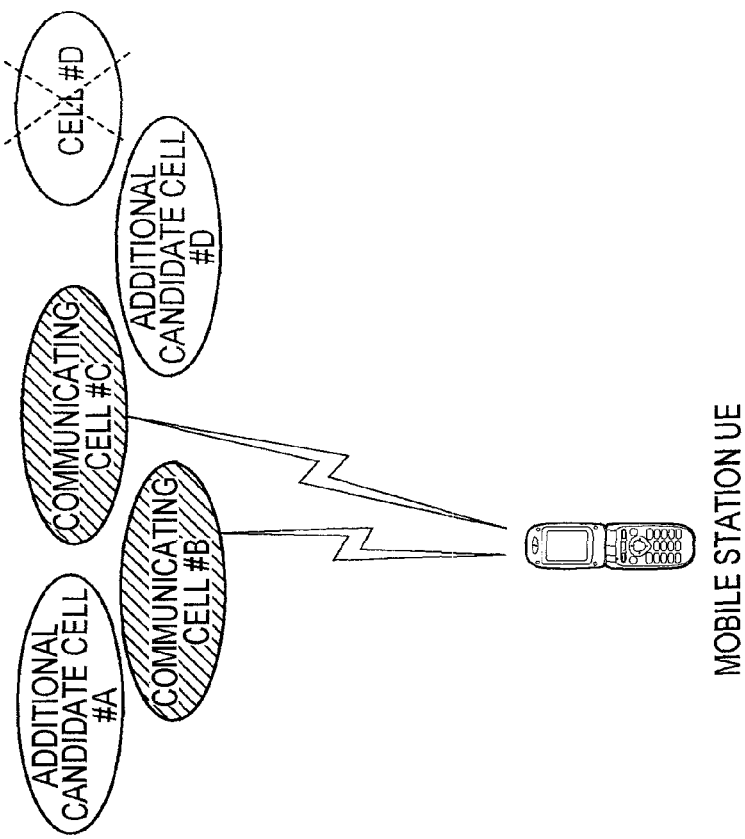
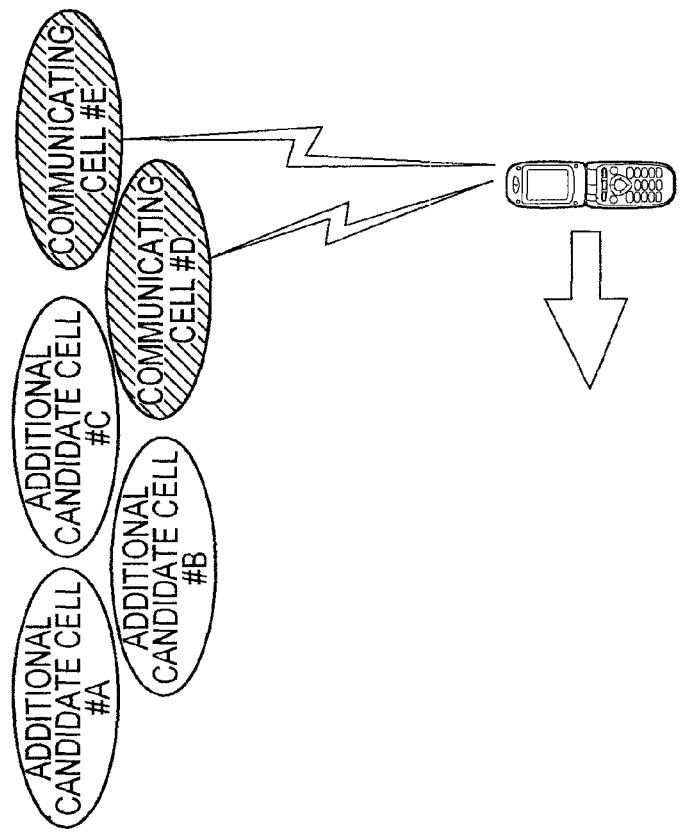

MOBILE COMMUNICATION METHOD AND NETWORK DEVICE

TECHNICAL FIELD

The present invention relates to a mobile communication method in which a mobile station communicating with a first cell measures and reports reception quality in a neighboring cell of the first cell, the neighboring cell being notified by the network device, and relates to the network device.

BACKGROUND ART

Heretofore, a mobile communication system as shown in FIG. 6 has been known in which multiple cells #11 to #32 are formed and a mobile station UE is configured to communicate in an appropriate cell.

In the conventional mobile communication system, a radio network controller RNC is configured to determine a cell with which the mobile station UE should establish a radio link, on the basis of information such as reception quality of each cell notified by the mobile station UE, and then to enable the mobile station UE to perform communications by establishing a radio link between the mobile station UE and a radio base station NodeB in this determined cell.

In a W-CDMA type mobile communication system, a scrambling code is assigned to each cell, and the mobile station UE is configured to identify a cell in the downward radio link by searching the scrambling code.

Moreover, as shown in FIGS. 7(a) and 7(b), when traveling, the mobile station UE can continue communication without disconnecting the radio link, by sequentially switching the radio links with the radio base stations NodeB from one to another.

Furthermore, for each cell, the radio network controller RNC previously manages information (called neighboring cell information below) on neighboring cells (i.e., one or more cells which the mobile station UE communicating in the cell may possibly select next).

The radio network controller RNC is configured to sequentially update a list of candidate cells for addition (called addition-candidate cell list below) and to notify the mobile station UE of the update result, every time the one or more cells with which the mobile station UE is establishing a radio link (called communicating cell below) change. The addition-candidate cells are the neighboring cells that the mobile station UE may possibly select next, and the list is updated according to neighboring cell information managed for each communicating cell.

As a result, the communicating mobile station UE does not need to search for the next cell to establish a radio link with from among the entirety of the possible cells existing in the mobile communication system, but only needs to search for the next cell to establish the radio link with from among neighboring cells included in the addition-candidate cell list notified by the radio network controller RNC. In this way, power consumption and time required for the cell search can be reduced.

For example, assume a case where a cell (home cell) covered by a small radio base station NodeB which can be used only by a specific mobile station UE is located within a cell (macro cell) in a communication area covered by a radio base station NodeB which can be used by a general mobile station UE. In this case, although the general mobile station UE is unable to access the home cell, the radio network controller RNC transmits neighboring cell information including the home cell and the general mobile station UE measures reception quality in the home cell on the basis of the neighboring cell information. Hence, there has been a problem that the mobile station UE wastefully consumes power for such measuring.

Additionally, in the WCDMA type mobile communication system, the maximum number of cells that can be included in the neighboring cell information is 32. Accordingly, when there are many home cells in the macro cell, the entirety of the home cells cannot be included as the neighboring cells of this macro cell. This is a constraint on execution of handover from the macro cell to the home cell, and may cause a problem of poor continuity in a communication service.

DISCLOSURE OF THE INVENTION

The present invention is made in view of the above problem, and aims to provide a mobile communication method and a network device capable of improving continuity in a communication service while preventing wasteful power consumption in the mobile station.

The first feature of the present invention relates to a mobile communication method in which a mobile station communicating with a first cell measures and reports reception quality in a neighboring cell of the first cell, the neighboring cell being notified by a network device. The method includes step A of the network device detecting a cell that does not allow access from the mobile station, and step B of the network device notifying the mobile station of the neighboring cell of the first cell excluding the detected cell that does not allow access from the mobile station.

In the first feature of the present invention, in the step B, the network device may exclude the cell that does not allow access from the mobile station from the neighboring cell of the first cell, only when a cell usable by the mobile station is detected in place of the cell that does not allow access from the mobile station.

In the first feature of the present invention, in the step A, the network device may determine the neighboring cell of the first cell depending on a communication service providable to the mobile station.

The second feature of the present invention relates to a network device used in a mobile communication system in which a mobile station communicating with a first cell measures and reports reception quality in a neighboring cell of the first cell. The device includes a detection unit configured to detect a cell that does not allow access from the mobile station, and a notification unit configured to notify the mobile station of the neighboring cell of the first cell excluding the detected cell that does not allow access from the mobile station.

In the second feature of the present invention, the notification unit may exclude the cell that does not allow access from the mobile station from the neighboring cell of the first cell, only when a cell usable by the mobile station is detected in place of the cell that does not allow access from the mobile station.

In the second feature of the present invention, the network device may include a determination unit configured to determine the neighboring cell of the first cell depending on a communication service providable to the mobile station.

BRIEF DESCRIPTION OF THE DRAWINGS

FIG. 3 is a diagram showing an example of neighboring cell information managed by a neighboring cell information management unit of the radio network controller according to the first embodiment of the present invention.

FIG. 4 is a diagram showing an example of an access list managed by an access list management unit of the radio network controller according to the first embodiment of the present invention.

FIG. 7 is a diagram for explaining handover carried out in a general mobile communication system.

BEST MODES FOR CARRYING OUT THE INVENTION (Configuration of Mobile Communication System According to First Embodiment of Present Invention)

With reference to FIGS. 1 to 4, a description is given of a configuration of a mobile communication system according to a first embodiment of the present invention.

Figure 1:
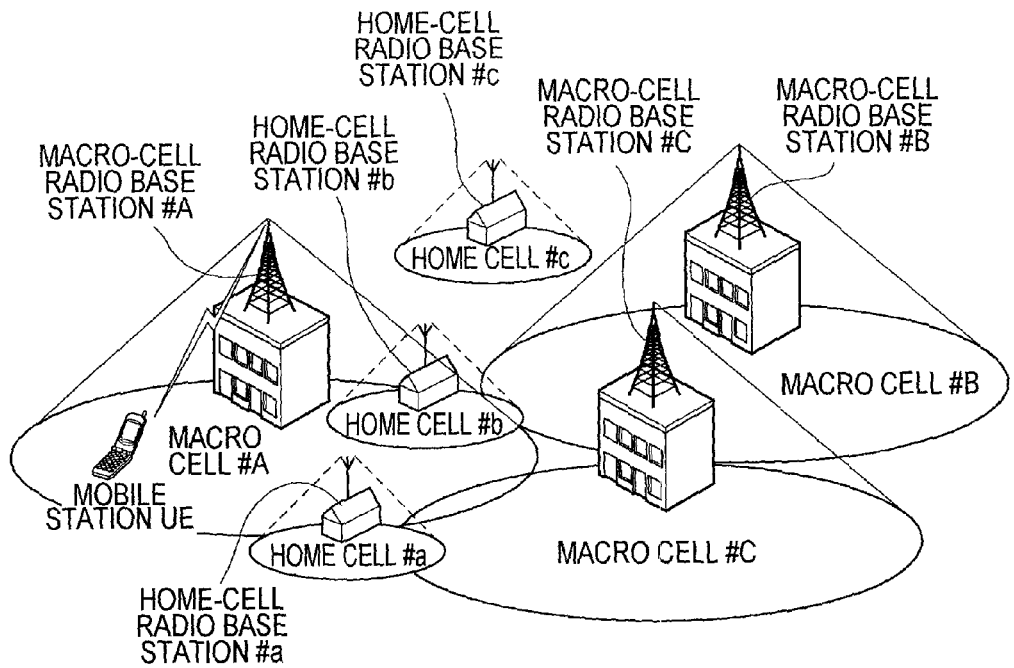
FIG. 1 is an overall configuration diagram of a mobile communication system according to a first embodiment of the present invention.

As shown in FIG. 1, the mobile communication system of this embodiment comprises a macro-cell radio base station #A which covers a macro cell #A, a macro-cell radio base station #B which covers a macro cell #B, a macro-cell radio base station #C which covers a macro cell #C, a home-cell radio base station (femto radio base station) #a which covers a home cell #a, a home-cell radio base station (femto radio base station) #b which covers a home cell #b and a home-cell radio base station (femto radio base station) #c which covers a home cell #c.

Note that in this embodiment, the home cells #a and #b are located inside the macro cell #A while the home cell #c is located outside the macro cell #A.

In addition, in this embodiment, when communicating with the macro cell #A (first cell), a mobile station UE is configured to measure and report reception quality in neighboring cells of the macro cell #A on the basis of an RRC signal (MEASUREMENT CONTROL) transmitted from a radio network controller RNC.

Figure 2:
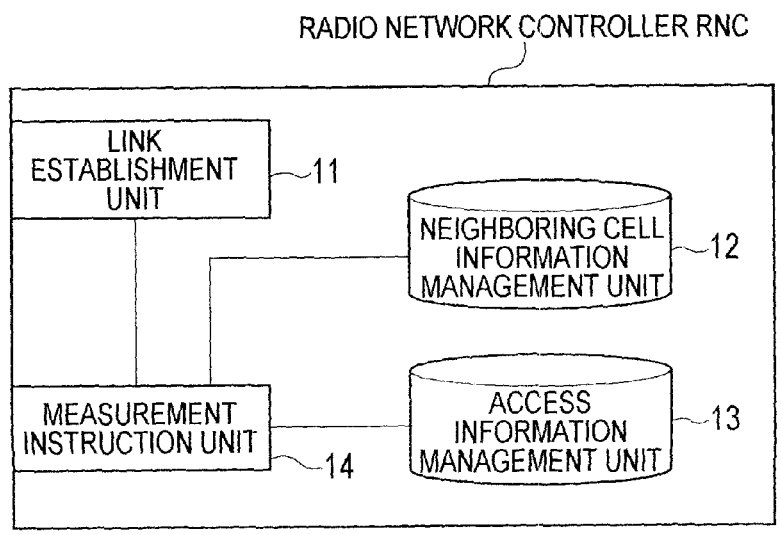
FIG. 2 is a functional block diagram of a radio network controller according to the first embodiment of the present invention.

As shown in FIG. 2, the radio network controller RNC is a network device having a link establishment unit 11, a neighboring cell information management unit 12, an access information management unit 13 and a measurement instruction unit 14.

The link establishment unit 11 is configured to manage establishment, switching and disconnection of a radio link between the mobile station UE and a radio base station NodeB.

The neighboring cell information management unit 12 is configured to manage neighboring cell information which includes information on neighboring cells of each cell.

FIG. 3 shows an example of neighboring cell information on the macro cell #A managed by the neighboring cell information management unit 12. In the example of FIG. 3, the neighboring cell information management unit 12 manages the following items as neighboring cell information on the macro cell #A. "Neighboring cell" indicates neighboring cells of the macro cell #A, and "frequency" indicates whether or not the frequency used in the cell is the same as the frequency used in the macro cell #A.

The access information management unit 13 is configured to manage access information for each cell indicating mobile stations which are allowed access to the cell.

FIG. 4 shows an example of access information managed by the access information management unit 13. In the example of FIG. 4, the access information management unit 13 manages "cell" indicating home cells under control of the radio network controller RNC and "access-allowed mobile station" indicating mobile stations which are allowed access to the home cell.

The measurement instruction unit 14 is configured to notify the mobile station UE communicating in a specific cell (macro cell or home cell) of neighboring cells of the specific cell by use of an RRC signal (MEASUREMENT CONTROL).

Specifically, the measurement instruction unit 14 is configured to detect a cell (home cell) which does not allow access from the mobile station UE by referring to the neighboring cell information management unit 12 and the access information management unit 13, to exclude the detected cell not allowing access from the mobile station UE from neighboring cells of the specific cell (macro cell or home cell), and to notify the mobile station UE of the neighboring cells.

For example, if the mobile station UE establishes a radio link in the macro cell #A, the measurement instruction unit 14 extracts the macro cells #B and #C as well as home cells #a and #b from the neighboring cell information management unit 12 as the neighboring cell information on the macro cell #A.

Here, if the mobile station UE is allowed access to the home cells #a and #b, the measurement instruction unit 14 instructs the mobile station UE to measure reception quality in all of the macro cells #B and #C as well as home cells #a and #b extracted from the neighboring cell information management unit 12 as the neighboring cells of the macro cell #A. As a result, the mobile station UE can measure and report reception quality in the macro cells #B and #C as well as in the home cells #a and #b.

In contrast, if the mobile station UE is not allowed access to the home cells #a and #b, the measurement instruction unit 14 excludes the home cells #a and #b which are not allowed access from among the macro cells #B and #C as well as home cells #a and #b extracted from the neighboring cell information management unit 12. Then, the measurement instruction unit 14 gives an instruction to measure reception quality only in the macro cells #B and #C. As a result, the mobile station UE can measure and report reception quality only in the macro cells #B and #C, and not measure reception quality in the home cells #a and #b.

In addition, the measurement instruction unit 14 may be configured to exclude a cell that does no allow access from the mobile station UE from neighboring cells of a specific cell (first cell) only in the following case. That is, to exclude the cell that does not allow access from the mobile station UE only when a cell that can be used by the mobile station UE is detected in place of the cell not allowing access from the mobile station UE.

For example, the measurement instruction unit 14 may be configured not to exclude the home cells #a and #b from the neighboring cells to be notified, in a case where the mobile station UE is not allowed access to the home cells #a and #b, and yet a usable cell other than the home cells #a and #b cannot be detected.

As a result, when continuity of the communication service is more important than inhibition of access from the mobile station UE to the home cell, such as in an emergency, the mobile station UE is enabled to continue communication by using the home cell that the mobile station UE is normally not allowed access.

Moreover, the measurement instruction unit 14 may be configured to determine neighboring cells of the cell (first cell) in which the mobile station is communicating, according to communication services (such as a high-speed communication service in a limited area) that can be provided to the mobile station UE.

For example, even when the mobile station UE is allowed access to the home cells #a and #b, the measurement instruction unit 14 may be configured to notify the mobile station UE of neighboring cell information including only the home cell #a in the following case. Specifically, the mobile station UE uses a high-speed communication service for a limited area and the high-speed communication service for a limited area is provided in the home cell #a (the high-speed communication service for a limited area is not provided in the home cell #b).

(Operation of Mobile Communication System according to First Embodiment of Present Invention)

Figure 5:
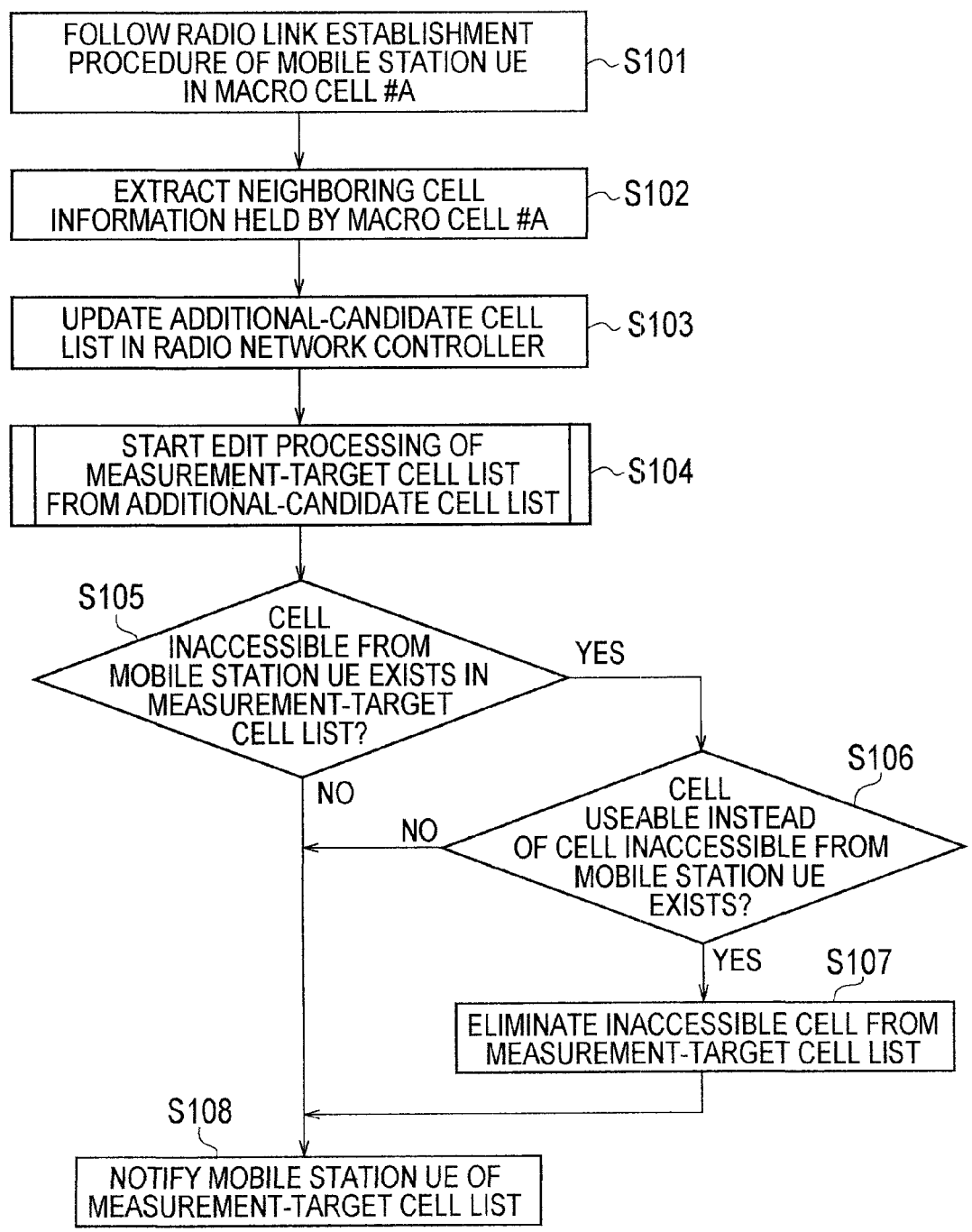
FIG. 5 is a sequence diagram illustrating an operation of the radio network controller according to the first embodiment of the present invention.
Figure 6:
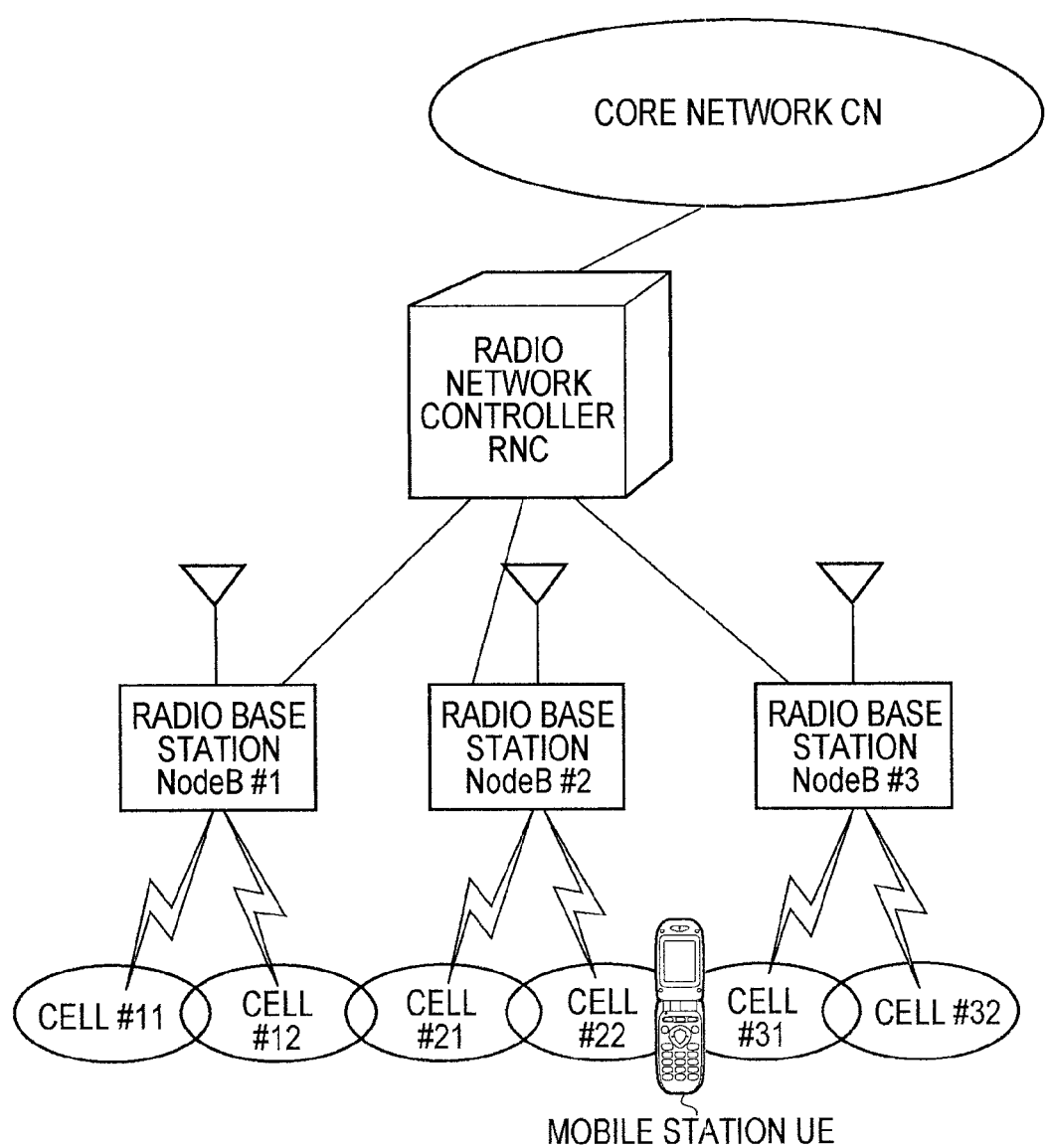
FIG. 6 is a diagram showing a configuration of a general mobile communication system.

With reference to FIG. 5, a description is given of an operation of the radio network controller RNC according to the first embodiment of the present invention.

As shown in FIG. 5, in step S101, the radio network controller RNC instructs the mobile station UE to establish a radio link in the macro cell #A.

In step S102, the radio network controller RNC extracts neighboring cell information on the macro cell #A.

In step S103, the radio network controller RNC updates the addition-candidate cell list related to the mobile station UE, according to the extracted neighboring cell information on the macro cell #A.

In step S104, the radio network controller RNC sets the addition-candidate cell list related to the mobile station UE as the list of measurement target cells (called measurement-target cell list below) being neighboring cells of which reception quality should be measured by the mobile station UE.

In step S105, the radio network controller RNC determines whether or not a cell that does not allow access from the mobile station UE exists in the measurement-target cell list.

If it is determined that such a cell exists, the operation proceeds to step S106, and if not, the operation proceeds to step S108.

In step S106, the radio network controller RNC determines whether or not there is a cell that can be used by the mobile station UE instead of the cell that does not allow access from the mobile station UE.

If it is determined that there is, the operation proceeds to step S107, and if not, the operation proceeds to step S108.

In step S107, the radio network controller RNC eliminates the cell that does not allow access from the mobile station UE from the measurement-target cell list.

In step S108, the radio network controller RNC notifies the mobile station UE of the measurement-target cell list by use of an RRC signal (MEASUREMENT CONTROL).

(Advantageous Effects of Mobile Communication System According to First Embodiment of Present Invention)

According to the mobile communication system of the first embodiment, in a case where there is a home-cell radio base station NodeB that does not allow access (establishment of radio link or utilization of communication service) from a specific mobile station UE, the mobile station UE is prevented from performing redundant measurement of reception quality, and continuity of the communication service for the traveling mobile station UE can be expected.

According to the mobile communication system of the first embodiment of the present invention, even when there are many home cells #a and #b in the macro cell #A, these home cells #a and #b are included in neighboring cell information and notified only to the mobile station UE that is allowed access to the home cells #a and #b. Thus, diversity handover from the macro cell #A to the home cells #a and #b can be performed.

Moreover, the mobile communication system of the first embodiment of the present invention enables establishment of a radio link limited to a cell capable of providing a specific communication service. The specific communication service is, for example, a high-speed communication service for a limited area desired to be provided preferentially to the mobile station UE. Hence, continuity can be improved for a specific communication service desired to be provided preferentially.

Modified Example

Although the above embodiment is described by taking a W-CDMA type mobile communication system as an example, the present invention is not limited to this mobile communication system, and is also applicable to an LTE (Long Term Evolution) type mobile communication system, for example.

In this case, the functions of the radio base station NodeB and the radio network controller RNC described above are installed in a radio base station eNB or in an exchange MME. In this Modified Example, the exchange MME is configured to serve as the above network device.

Additionally in this case, each cell (macro cell and home cell) is identified by use of a "Tracking Area ID."

Here, the operation of the above-mentioned home-cell radio base stations, macro-cell radio base stations, and radio network controller RNC may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the mobile station UE, the home-cell radio base stations, macro-cell radio base stations, and the radio network controller RNC. Alternatively, the storage medium and the processor may be provided in the mobile station UE, the home-cell radio base stations, macro-cell radio base stations, and the radio network controller RNC as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the present invention provides a mobile communication method and a network device capable of improving continuity in a communication service while preventing wasteful electricity consumption in the mobile station.

The invention claimed is:

1. A mobile communication method in a mobile communication system that includes a macro cell and a home cell, in which a mobile station communicating with the macro cell measures and reports reception quality in a neighboring cell of the macro cell, the neighboring cell being notified to the mobile station by a network device, the method comprising:

managing, by the network device, neighboring cell information indicating at least one neighboring cell of the macro cell and an access list indicating whether the mobile station is allowed to access the home cell;

detecting, by the network device, the home cell and determining whether or not the home cell allows access from the mobile station by referring to the neighboring cell information and the access list;

excluding, by the network device, from a measurement-target cell list, the home cell as a neighboring cell which the mobile station can measure and report reception quality from when the home cell does not allow access from the mobile station; and notifying, by the network device, the mobile station of the measurement-target cell list which includes one or more neighboring cells which the mobile station can measure and report reception quality from, wherein, in the excluding step, the network device excludes the home cell that does not allow access from the mobile station as a neighboring cell which the mobile station can measure and report reception quality from, only when detecting a cell in which a predetermined service is usable by the mobile station, and the network device does not exclude the home cell that does not allow access from the mobile station as a neighboring cell, when the cell in which the predetermined service is usable by the mobile station is not detected.

2. The mobile communication method according to claim 1, wherein the network device determines neighboring cells of the macro cell depending on a communication service providable to the mobile station.

3. A network device used in a mobile communication system, which includes a macro cell and a home cell, and in which a mobile station communicating with the macro cell measures and reports reception quality in a neighboring cell of the macro cell, the device comprising:

a neighboring cell information management unit configured to manage neighboring cell information indicating at least one neighboring cell of the macro cell;

an access information management unit configured to manage an access list indicating whether the mobile station is allowed to access the home cell;

a detection unit configured to detect the home cell and determine whether or not the home cell allows access from the mobile station by referring to the neighboring cell information and the access list; and a notification unit configured to exclude, from a measurement-target cell list, the home cell as a neighboring cell which the mobile station can measure and report reception quality from when the home cell does not allow access from the mobile station and notify the mobile station of the measurement-target cell list which includes one or more neighboring cells which the mobile station can measure and report reception quality from, wherein the notification unit excludes the home cell that does not allow access from the mobile station as a neighboring cell which the mobile station can measure and report reception quality from, only when detecting a cell in which a predetermined service is usable by the mobile station, and the network device does not exclude the home cell that does not allow access from the mobile station as a neighboring cell, when the cell in which the predetermined service is usable by the mobile station is not detected.

4. The network device according to claim 3, further comprising a determination unit configured to determine neighboring cells of the macro cell depending on a communication service providable to the mobile station.

* * * * *